US006928640B2

(12) United States Patent
Schlussman

(10) Patent No.: US 6,928,640 B2
(45) Date of Patent: Aug. 9, 2005

(54) SYSTEM AND METHOD FOR BUILDING SOURCE CODE FOR CONNECTING TO SYSTEMS

(75) Inventor: Bret D. Schlussman, New York, NY (US)

(73) Assignee: qbt Systems, Inc., New York, NY (US)

( * ) Notice: Subject to any disclaimer, the term of this patent is extended or adjusted under 35 U.S.C. 154(b) by 570 days.

(21) Appl. No.: 10/053,778

(22) Filed: Jan. 22, 2002

(65) Prior Publication Data

US 2003/0041180 A1 Feb. 27, 2003

Related U.S. Application Data

(60) Provisional application No. 60/314,408, filed on Aug. 23, 2001.

(51) Int. Cl.[7] ................................................. G06F 9/45
(52) U.S. Cl. ........................ 717/137; 717/106; 717/114
(58) Field of Search .......................... 717/137, 106–117, 717/136, 139–140; 715/500, 513; 719/310, 313–315, 320, 328; 707/104.1

(56) References Cited

U.S. PATENT DOCUMENTS 6,253,369 B1 * 6/2001 Cloud et al. ................. 717/136
6,446,081 B1 * 9/2002 Preston ..................... 707/104.1

* cited by examiner

Primary Examiner—Hoang-Vu Antony Nguyen-Ba
(74) Attorney, Agent, or Firm—Ostrolenk, Faber, Gerb & Soffen, LLP

(57) ABSTRACT

A middleware schema for describing message transactions is provided, including a structured framework of commands and attributes to be employed by technical personnel in order to develop messages that comply with a target API. The invention applies the middleware schema to interpret the functionality of a source document, and generates high level program source code that formats data messages to comply with a target API.

21 Claims, 11 Drawing Sheets

APPLICATION PROGRAMMING INTERFACE

REQUEST PACKET

| FIELD DESCRIPTION | FORMAT | CONTENT |
|---|---|---|
| TRANSACTION CODE | 3N | '033' |
| CREDIT UNION ACCESS CODE | 3N | CODE ASSOCIATED WITH EACH CREDIT UNION ASSIGNED BY HOST |
| MEMBER NUMBER TO WITHDRAW FUNDS FROM | 9N | (ENTERED BY CALLER) |
| ACCOUNT SUFFIX TO WITHDRAW FUNDS FROM | 3N | (ENTERED BY CALLER) |
| TRANSFER AMOUNT | 9N | (TWO DECIMAL POSITIONED ASSUMED) |
| POST INDICATOR | 1A | N - PRELIMINARY EDIT DO NOT UPDATE FILES |
|  |  | Y - MEMBER HAS CONFIRMED THEY WANT TO POST TRANSACTION UPDATE FILES |

RESPONSE PACKET

| FIELD DESCRIPTION | FORMAT | CONTENT |
|---|---|---|
| TRANSACTION CODE | 3N | '033' |
| CREDIT UNION ACCESS CODE | 3N |  |
| MEMBER NUMBER | 9N |  |
| HOST RESPONSE CODE | 3N | 000 - POSITIVE RESPONSE, CONTINUE SCRIPT |
|  |  | 210-214 - READ ERROR, REPEAT MENU |
|  |  | 220-221 - READ ERROR, REPEAT MENU |
| SIGN FIELD | 1A | + OR -, NEGATIVE OR POSITIVE BALANCE |
| CURRENT BALANCE OF WITHDRAWAL FROM ACCOUNT (BEFORE TRANSFER) | 9N | N - PRELIMINARY EDIT DO NOT UPDATE FILES |
| SIGN FIELD | 1A | + OR -, NEGATIVE OR POSITIVE BALANCE |
| AVAILABLE BALANCE OF WITHDRAWAL FROM ACCOUNT (BEFORE TRANSFER) | 9N |  |

FIG. 2

MAPPING DOCUMENT

REQUEST PACKET

| API FIELD DESCRIPTION | VT SERVER FIELD DEFINITIONS |
|---|---|
| TRANSACTION CODE | HARD CODE - SET TO '033' |
| CREDIT UNION ACCESS CODE | CODE RETRIEVED FROM DATABASE CONFIGURATION FOR EACH PARTICULAR CREDIT UNION |
| MEMBER NUMBER TO WITHDRAW FUNDS FROM | FROM INTERNAL FIELD TRANSACACCNTFROM BEFORE FIELD SEPARATOR |
| ACCOUNT SUFFIX TO WITHDRAW FUNDS FROM | FROM INTERNAL FIELD TRANSACACCNTFROM AFTER FIELD SEPARATOR |
| TRANSFER AMOUNT | FROM INTERNAL FIELD TRANSACAMOUNT. INTERNAL FIELD INCLUDES DECIMAL POINT. EXTERNAL FIELD DOES NOT. REMOVE DECIMAL POINT BEFORE SENDING. MAXIMUM AMOUNT IS 9,999,999.99 |
| POST INDICATOR | SET BASED ON TRANSACPOSTMODE. IF 0, SET TO N. IF 1, SET TO Y. |

RESPONSE PACKET

| FIELD DESCRIPTION | CONSTANT |
|---|---|
| TRANSACTION CODE | FIELD IS ECHOED, NOT USED IN RESPONSE |
| CREDIT UNION ACCESS CODE | FIELD IS ECHOED, NOT USED IN RESPONSE |
| MEMBER NUMBER | FIELD IS ECHOED, NOT USED IN RESPONSE |
| HOST RESPONSE CODE | EXTERNAL SYSTEM'S RESPONSE CODE. MAP TO THE VT SERVER RESPONSE CODE BASED ON THE CONFIGURATION TABLES. |
| SIGN FIELD | POSITIVE/NEGATIVE SIGN INDICATOR FOR FIELD THAT FOLLOWS. USE TO MAP APPROPRIATELY. |
| CURRENT BALANCE OF WITHDRAWAL FROM ACCOUNT (BEFORE TRANSFER) | MAP TO THE LEDGER BALANCE FIELD OF THE INTERNAL MESSAGE. QBT BALANCE INDICATOR FOR LEDGER IS 1. |
| SIGN FIELD | POSITIVE/NEGATIVE SIGN INDICATOR FOR FIELD THAT FOLLOWS. USE TO MAP APPROPRIATELY. |
| AVAILABLE BALANCE OF WITHDRAWAL FROM ACCOUNT (BEFORE TRANSFER) | MAP TO THE LEDGER BALANCE FIELD OF THE INTERNAL MESSAGE. QBT BALANCE INDICATOR FOR LEDGER IS 2. |

PRIOR ART
FIG. 3

```
1.   if ( !FAILED( spElement->getElementsByTagName(
2.           L"LogMessageIn", &spNodes ) ) && spNodes )
3.   {
4.       long lLength = 0;
5.       if ( FAILED( spNodes->get_length(&lLength)))
6.       {
7.           return ;
8.       }
9.       CString sText;
10.      for ( long i = 0 ; i < lLength ;i++ )
11.      {
12.          spNode.Release();
13.          if ( !FAILED ( spNodes->get_item( i , &spNode ) ) )
14.          {
15.              CheckOutputLine( 0, spNode );
16.              GetAttribute( spNode , L"id", sText );
17.              if ( m_bDoVB )
18.              {
19.                  sText = _T("Sub LogMessageIn_")+ sText + _T("( vtObj as VTMsgObj )");
20.                  OutputLine( 0 , sText );
21.                  OutputLine( 0, _T("\r\n") );
22.                  OutputLine( 1, _T("'Temp variables used by routine\r\n"));
23.                  OutputLine( 1, _T("Dim sTmp As String\r\n") );
24.                  OutputLine( 1, _T("Dim sTmp4 As String\r\n") );
25.                  OutputLine( 1, _T("Dim sTmp5 As String\r\n") );
26.                  OutputLine( 1, _T("Dim sTmp3 As String\r\n") );
27.                  OutputLine( 1, _T("Dim sTmp2 As String\r\n") );
28.                  OutputLine( 1, _T("Dim sCmp As String\r\n") );
29.                  OutputLine( 1, _T("Dim iOffset As integer\r\n") );
30.                  OutputLine( 1, _T("\r\n"));
31.                  OutputLine( 1, _T("On Error Goto ErrOut\r\n") );
32.                  OutputLine( 1, _T("\r\n"));
33.              } else
34.              {
35.                  AddCFunction( "LogMessageIn_" + sText);
36.                  sText = _T("void MsgHandler::LogMessageIn_") + sText;
37.                  sText += _T("( IDualVTMsgObj * vtObj )\r\n{\r\n\ttry {\r\n");
38.                  OutputLine( 0 , sText );
39.                  OutputLine( 0, _T("\r\n") );
40.                  OutputLine( 1, _T("//Temp variables used byroutine\r\n"));
41.                  OutputLine( 1, _T("CComBSTR sTmp;\r\n") );
42.                  OutputLine( 1, _T("CComBSTR sTmp2;\r\n") );
43.                  OutputLine( 1, _T("CComBSTR sTmp3;\r\n") );
44.                  OutputLine( 1, _T("CComBSTR sTmp5;\r\n") );
45.                  OutputLine( 1, _T("CComBSTR sTmp4;\r\n") );
46.                  OutputLine( 1, _T("CComBSTR sCmp;\r\n") );
47.                  OutputLine( 1, _T("int iOffset = 0, iLastPos = 0;\r\n") );
48.                  OutputLine( 1, _T("\r\n"));
49.                  OutputLine( 1, _T("//End of temp variables\r\n"));
50.                  OutputLine( 1, _T("\r\n"));
51.              }

52.              m_bProcessingGetResponseCode += 1;
53.              ProcessMessageIn( 1, spNode );
54               m_bProcessingGetResponseCode -= 1;

55.              if ( m_bDoVB )
56.              {
57.                  OutputLine(0, _T("ErrOut:\r\n"));
58.                  OutputLine(1, _T("vtObj.EndSetErr Err.Number, Err.Description\r\n"));
59.              }
```

Fig. 9

```
1. void CXMLEditDoc::ProcessMessageIn( int iTabIndex, CComPtr<IXMLDOMNode>&
spParentNode, BOOL bInBuildField, BOOL *bIfWasProccessed )
2. {
3.      CComPtr<IXMLDOMNode> spChild;
4.      if ( FAILED( spParentNode->get_firstChild( &spChild)) || !spChild )
5.      {
6.              return;
7.      }

8.      CComPtr<IXMLDOMNodeList> spList = NULL;
9.      if ( !FAILED( spParentNode->get_childNodes( &spList ) ) && spList )
10.     {
11.             CComBSTR sNodeName;
12.             CComBSTR sText;
13.             CComPtr<IXMLDOMNode> spNode;
14.             long lLength = 0;
15.             spList->get_length( &lLength );
16.             for ( long i = 0 ; i < lLength ; i++ )
17.             {
18.                     spNode.Release();
19.                     sText.Empty();
20.                     sNodeName.Empty();
21.                     if ( !FAILED ( spList->get_item( i , &spNode ) ) )
22.                     {
23.                             spNode->get_nodeName( &sNodeName );

24.                             CheckOutputLine( iTabIndex, spNode );

25.                             void *ptr = NULL;

26.                             CString strNodeName = sNodeName;

27.                             strNodeName.MakeUpper();

28.                             // now the ugly look up table
29.                             glb_MapOfXMLStringsToIds.Lookup( strNodeName, ptr );

30.                             int id = (int) ptr;

31.                             switch ( id )
32.                             {
 .
 .
56.                             case IDTAG_BitmapDateIn:
57.                             {
58.                                     CString sBitPos;
59.                                     CString sLen;
60.                                     CString sTranField;
 .
 .                      {
74.                                                     OutputLine( iTabIndex, _T("if
vtObj.IsBitmapPositionSet( ") , _T("if (IsBitmapPositionSet( vtObj, "));
                                                    OutputLine( 0, sBitPos );
                                                    OutputLine( 0, _T(") Then\r\n") , _T(")) {\r\n") );
                                                    iTabIndex += 1;
                                                    // first lets get the data
                                                    CheckForPackedAttribute( iTabIndex, spNode );
```

Fig. 10

SYSTEM AND METHOD FOR BUILDING SOURCE CODE FOR CONNECTING TO SYSTEMS

CROSS-REFERENCE TO RELATED APPLICATIONS

This application is based upon and claims priority to U.S. provisional patent application Ser. No. 60/314,408, filed on Aug. 23, 2001, and entitled SYSTEM AND METHOD FOR BUILDING SOURCE CODE FOR CONNECTING TO CORE PROCESSING SYSTEMS, the entire disclosure of which is hereby incorporated by reference.

FIELD OF THE INVENTION

The present invention relates to a system and method for Electronic Transaction Systems, and, more specifically, for using XML to build real-time electronic financial transaction interfaces, in a language other than XML, that process the Financial Service Transactions.

BACKGROUND OF THE INVENTION

Many different computer systems exist today which request and receive electronic financial data. Computer systems that contain large amounts of data, referred to herein as "host systems," comprise large legacy systems and smaller scaled information servers. Host systems store information for a plurality of financial accounts, including checking accounts, credit accounts, money market accounts, and other kinds of financial market accounts. A plurality of different computer systems ("client systems") access the information stored on host systems and include personal computers, automatic teller machines, point-of-sale terminals, teller terminals, and any other consumer to business ("C2B"), business to business ("B2B") or business to business to consumer ("B2B2C"). Host systems and client systems interface with each other using middleware application software. Middleware applications route messages to and from designated endpoints (i.e., computer systems) over communication networks, such as the Internet. The financial industry constantly pressures financial institutions to deliver new, improved and uninterrupted supplies of financial information services. Middleware applications assist by connecting multiple client systems with multiple core processing systems (i.e., host systems) for services such as Electronic Financial Transactions ("EFT's"). Middleware applications provide "real-time" connectivity, in addition to managing multiple channels, by routing message transactions to appropriate destinations. Moreover, middleware applications provide mechanisms to handle error conditions to ensure that customer accounts are not adversely impacted by communication and data errors. Middleware applications also provide detail logs which provide a record of each message transaction.

A client system communicates with a host system via an application program interface ("API"). An API includes a set of definitions that enable programmers to use one or more features of the corresponding program application. A host system's API can incorporate some well recognized formats, such as the Open Financial Exchange ("OFX") or International Standards Organization ("ISO") formats. Alternatively, API's can incorporate proprietary formats, or some combination of both well-known and proprietary formats.

In order for a client system and a host system to communicate, programmers must adhere to the rules associated with each API. Technical specifications that are directed to a host system's API are provided in the industry to enable programmers to properly format message requests and responses. A computer program, referred to herein as a "message interface," enables the disparate systems to understand each other. The message interface operates to format data requests and responses, for example between financial computer systems, so the receiving system can interpret the data.

In the prior art, developing new message interfaces between banking systems typically requires gathering a team of people comprising at least one high level programmer and a technical documenter. The technical documenter develops a "mapping document" that explains the API for one or more programmers, and the programmer(s) develop computer program source code for message interfaces in response thereto.

The prior art development process for message interfaces is typically fraught with errors. For example, programmer(s) misinterpret a technical documenter's mapping document. Moreover, program "bugs" (e.g., program loop errors and memory management errors) cause errors during "run time" operations. The development and deployment time required for message interfaces can, therefore, be significant and costly due to errors and/or program bugs.

FIG. 1 shows two example data streams 2 that are transmitted between host systems and client systems. One data stream 2 is directed to a data packet for requests, the other data stream 2 is directed to a data packet for responses.

FIG. 2 shows a corresponding API specification 4 that is used to access and manipulate the data in the data stream 2. The API specification 4 identifies the fields in the data stream, and further provides descriptions of the fields enabling the programmer(s) to develop message interfaces. The example API specification 4 shown in FIG. 2 includes default values, data formatting rules and record definitions for request data packet 6, and response data packet 8.

FIG. 3 shows an example of a prior art mapping document 9. The document is developed by a technical person, and describes the specifications required to develop a message interface to effectuate communication between a client system and a host system.

FIG. 4 shows a flowchart illustrating a typical prior art process for building message interfaces. In step S10, a technical specification of a host API is received. In step S12, a technical documenter (e.g., a project manager) develops a mapping document to be used by programming staff to develop source code for a message interface. In step S14, programmer(s) generate and/or debug the program source code for the message interface. In step S16, the programmer(s) compile the source code into machine readable object code. In step S18, a determination is made by the programmer(s) whether or not the source code contains errors. For example, the source code may not compile, or compile with errors, and require changes thereto. When errors are discovered, the process loops back to step S14, the programmer(s) debug the source code, and compile the source code again in step S16. When the programmer(s) eventually compile the source code without errors, the process moves to step S20, and the message interface is deployed. The interface may still contain errors, for example due to misinterpretation of the technical documenter's mapping document. In step S22, if errors are found, the process loops back to step S14, and the programmer(s) debug the source code to identify and repair errors therein. The process continues indefinitely until the application runs free of errors, which, potentially, can take months to complete.

SUMMARY OF THE INVENTION

There is a need for a system and method to build message interfaces quickly and accurately without having to rely on technical documenters and computer programmers. New host systems and client systems continually emerge and require new API specifications and message interfaces to be developed. In the prior art, development of message interfaces, for example, to facilitate communication between disparate banking systems, is hampered by errors caused by misinterpretation and program bugs.

The present invention provides an efficient system and method for building message interfaces by eliminating steps required in the prior art. The present invention provides significant time and resource savings because, as described in detail below, fewer parties are involved in the message interface development process. Moreover, production of accurate program code that operates free of typical development and run-time errors, for example, compiling errors, infinite loops and memory management problems, is ensured. The present invention effectively automates processes that, in the prior art, had to be performed by specialized personnel. Therefore, the need for programmers and technical writers to generate message interfaces is effectively eliminated by the present invention.

In a typical arrangement, one message interface is developed for a host system and another interface is developed for a client system. Both message interfaces interact with middleware applications. Middleware applications route messages between multiple host systems and multiple client systems, for example in the banking industry. In accordance with the principles of the present invention, one party develops the message interfaces, thus eliminating the need for a documenter and a software developer (i.e., a programmer). Moreover, the resulting message interface modules are accurate and plug into the middleware application software seamlessly.

The present invention preferably provides a middleware schema for describing message transactions. A structured framework of commands and attributes is employed by technical personnel to develop messages that comply with a target host API, such as the Electronic Funds Transfer networks and other core processing systems. The middleware schema preferably directs the development of a message interface document. By adhering to the schema, high level program source code is generated that operates on data messages ensuring compliance with a target API.

Examples of functionality provided by the present invention include: defining bit positions and setting a bit map; creating packed or unpacked bit maps; creating packed or unpacked data fields; defining byte positions and setting a byte map; formatting fields (left or right justification); adding length indicators; padding fields with leading or trailing characters; and translating and formatting fields from an internal field structure to an external field structure.

The middleware schema, in accordance with the principles of the present invention, allows a technical person, for example a project manager, to use English-like words to develop message interface documents. Knowledge of a particular programming language is not required of the technical person. Once he or she is familiar with the target API and the middleware schema, the technical person preferably uses a "front-end" software application to develop a source document via the middleware schema. The present invention uses the source document to generate a complex and customized message interface in a high level programming language quickly and accurately.

In the preferred embodiment, the middleware schema is constructed in the extensible markup language ("XML"), a relatively easy pseudo-program development language.

XML is preferred because it is flexible and relative easy to use. In accordance with the principles of the present invention, any language, even a spoken language (e.g., English) can be used in lieu of XML.

When complete, the source document developed by the technical person is generated into high level program source code, for example, VISUAL BASIC, VISUAL C++, or Java. The source code is then compiled into machine-readable object code, for example, into a dynamic link library ("DLL") file, and seamlessly plugged into a middleware application. Notwithstanding a lack of knowledge of a specific Component Object Model (COM) architecture or a specific object-oriented programming language, users of the present invention build and customize message interfaces quickly and accurately that comply with variations on API protocols, for example, the International Standards Organization 8583 interface.

The present invention preferably does not use translation tables to generate message interfaces. Instead, documents created with the convenient front-end application are evaluated by the present invention and generated into high-level computer program source code. The source code is assured compliance with a target API because the middleware schema defined by the present invention is recognized during the process of generating the source code.

By allowing for source documents to be generated into source code by project managers without the need for programmers, new message interfaces are created in a fraction of the time needed in prior art development environments. Significant expenses associated with developing message interfaces are, therefore, eliminated. Moreover, accuracy is assured because the front-end application ensures adherence to the middleware schema, thus generating bug-free source code.

In summary, in accordance with the principle of the present invention, a project manager or other technical person (not necessarily a programmer) develops a source document using the front-end application, and generates the source document into high-level computer program source code. The project manager further compiles the source code into a machine readable interface, designed to plug into a middleware application. As noted above, middleware applications, such as VT SERVER, route messages between host systems and client systems, and are known in the art.

BRIEF DESCRIPTION OF THE DRAWING(S)

For the purposes of illustrating the invention, there is shown in the drawings a form which is presently preferred, it being understood however, that the invention is not limited to the precise arrangements and instrumentality shown. The features and advantages of the present invention will become apparent from the following description of the invention that refers to the accompanying drawings, in which:

FIG. 2 illustrates an example API specification;

FIG. 3 is an example prior art mapping document for programmers to develop message interfaces for an API;

FIG. 9 illustrates a sample program code to handle outgoing messages;

FIG. 10 illustrates sample programming code to handle incoming messages; and

DETAILED DESCRIPTION OF EMBODIMENTS OF THE INVENTION

The present invention provides for an improved way to create message interfaces for client systems to communicate with host systems. In accordance with the principles of the present invention, a technical person (e.g., a project manager) develops a source document by employing a predefined middleware schema. Using the present invention, the technical person generates the source document into source code that is in a high level programming language, for example, VISUAL BASIC, and the module that is produced therefrom is compiled and deployed.

Figure 1:
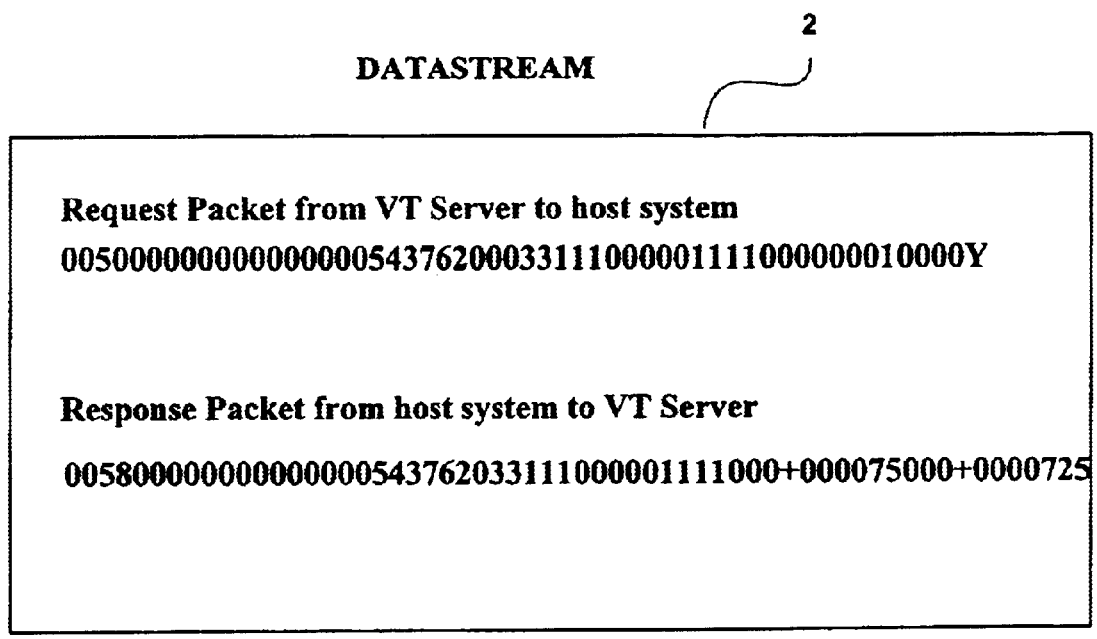
FIG. 1 illustrates a data stream packet transmitted between host systems and client systems.
Figure 4:
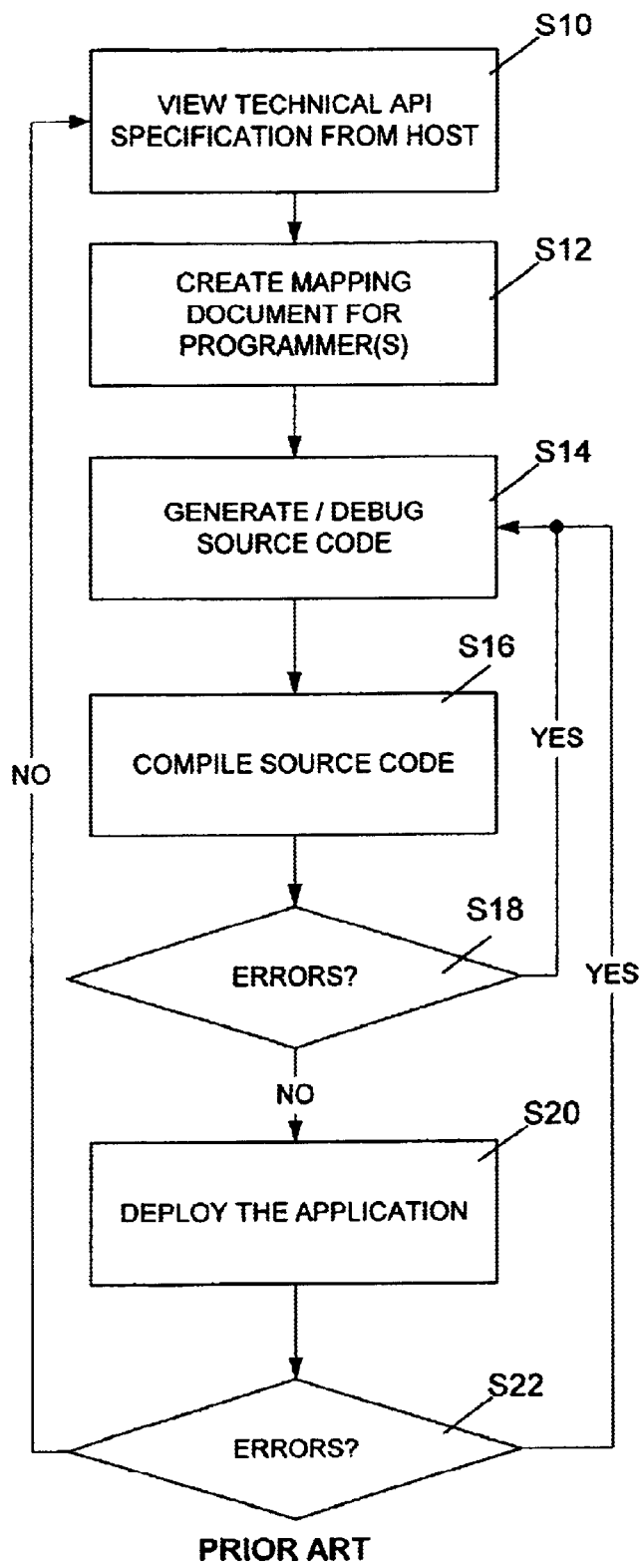
FIG. 4 shows a flowchart illustrating the prior art steps for generating an interface.
Figure 5:
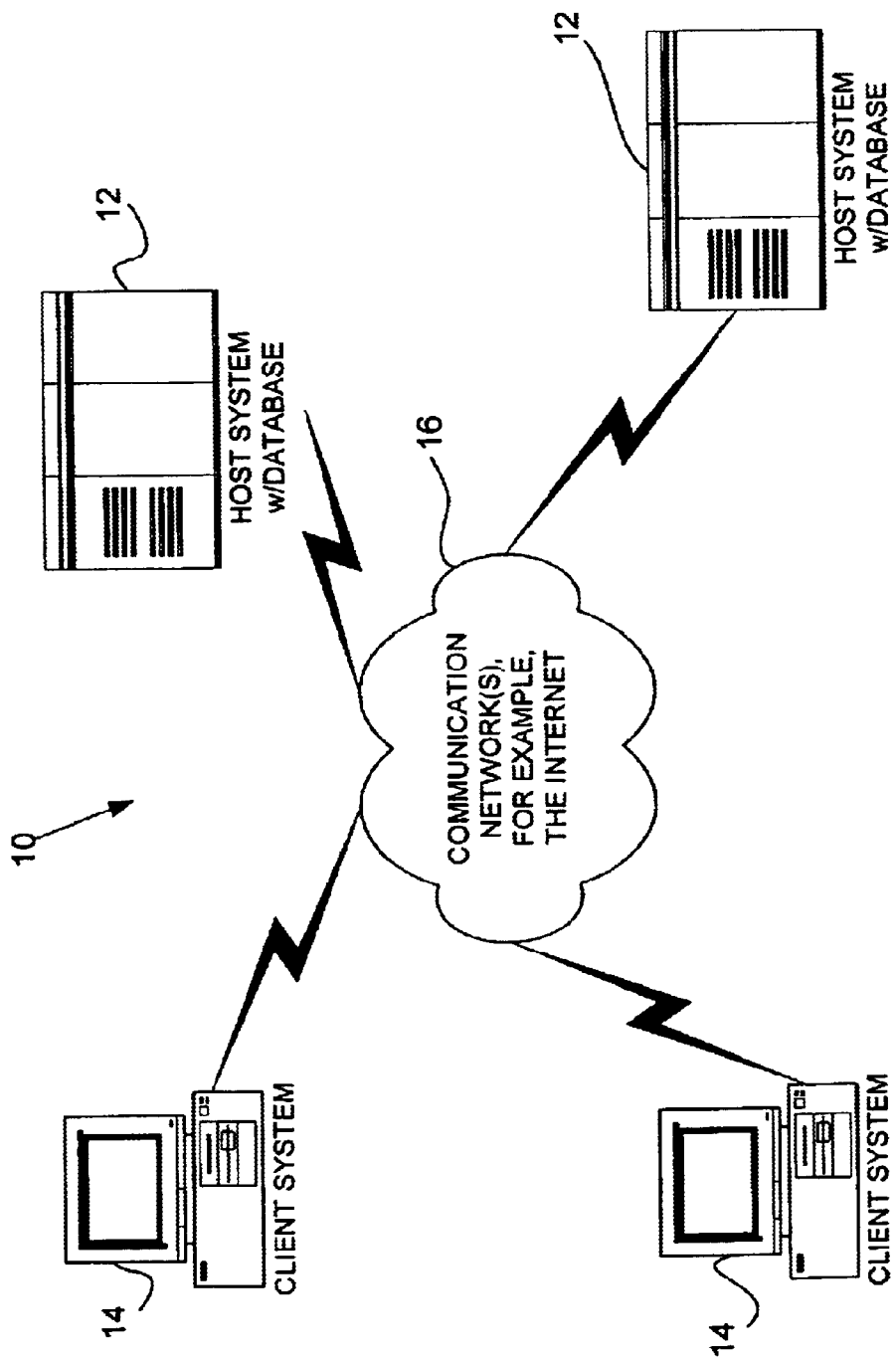
FIG. 5 shows an example hardware arrangement for a network based system according to the principles of the present invention.

Referring to the drawings in which like reference designators refer to like elements there is shown in FIG. 5 an example of a first preferred embodiment including a hardware arrangement for developing message interfaces and referred to generally as Message Interface System 10. Message Interface System 10 comprises at least one host system 12 and at least one client system 14, each of which are coupled to communication network 16. Host system 12 preferably includes all databases necessary to support the present invention. However, it is contemplated that host system 12 can access any required databases via communication network 16 or any other communication network to which host system 12 may be coupled. Communication network 16 is preferably a global public communication network such as the Internet, but can also be a wide area network (WAN), local area network (LAN), or other network that enables two or more computers to communicate with each other.

In the preferred embodiment, host system 12 and client system 14 are any devices that are capable of sending and receiving data across communication network 16, e.g., mainframe computers, mini computers, personal computers, laptop computers, personal digital assistants (PDA) and Internet access devices such as Web TV. In addition, client systems 14 are preferably equipped with a web browser, such as MICROSOFT INTERNET EXPLORER, NETSCAPE NAVIGATOR and the like. Host systems 12 and terminals 14 are coupled to communication network 16 using any known data communication networking technology.

Figure 6:
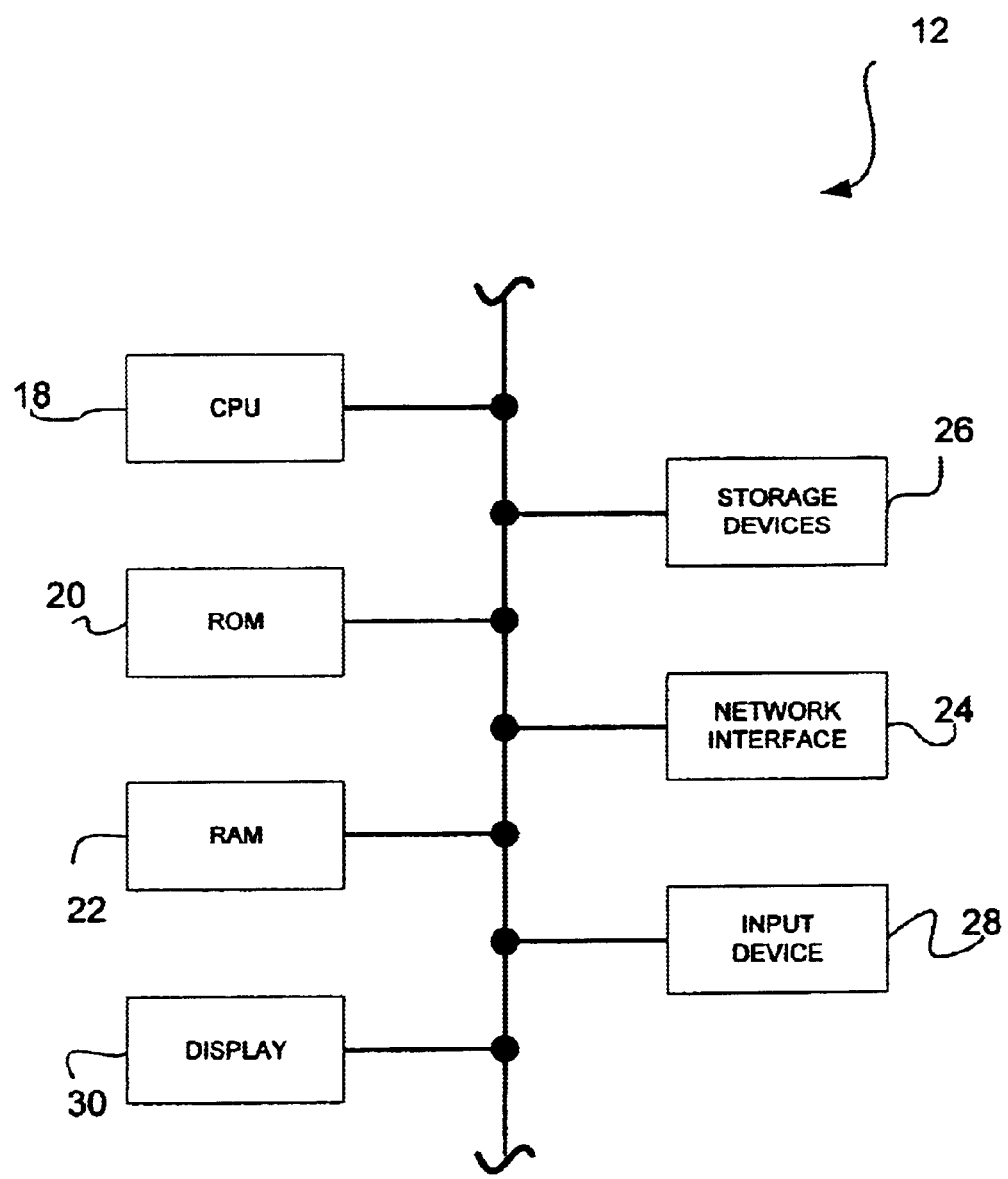
FIG. 6 is a block diagram of the functional elements constructed in accordance with the present invention.

As shown in FIGS. 5 and 6, the functional elements of each host system 12 include one or more central processing units (CPU) 18 used to execute software code and control the operation of host system 12, read-only memory (ROM) 20, random access memory (RAM) 22, one or more network interfaces 24 to transmit and receive data to and from other computing devices across a communication network, storage devices 26 such as a hard disk drive, floppy disk drive, tape drive, CD ROM or DVD for storing program code, databases and application data, one or more input devices 28 such as a keyboard, mouse, track ball, microphone and the like, and a display 30.

The various components of host system 12 need not be physically contained within the same chassis or even located in a single location. For example, storage device 26 may be located at a site which is remote from the remaining elements of host systems 12, and may even be connected to CPU 18 across communication network 16 via network interface 24. Host systems 12 include a memory equipped with sufficient storage to provide the necessary databases, forums, and other community services as well as acting as a web server for communicating hypertext markup language (HTML), Java applets, Active-X control programs and the like to client systems 14. Host systems 12 are arranged with components, for example, those shown in FIG. 5, suitable for the expected operating environment of host system 12. The CPU(s) 18, network interface(s) 24 and memory and storage devices are selected to ensure that capacities are arranged to accommodate expected demand.

As used herein, the term "link" refers to a selectable connection from one or more words, pictures or other information objects to others in which the selectable connection is presented within the web browser. The information object can include sound and/or motion video. Selection is typically made by "clicking" on the link using an input device such as a mouse, track ball, touch screen and the like. Of course, one of ordinary skill in the art will appreciate that any method by which an object presented on the screen can be selected is sufficient.

The functional elements shown in FIG. 6 (designated by reference numerals 18–30) are the same categories of functional elements present in client systems 14. However, not all elements need be present, for example, storage devices in the case of PDA's and the capacities of the various elements are arranged to accommodate the expected user demand. For example, CPU 18 in client system 14 may be a smaller capacity CPU than the CPU present in the host system 12. Similarly, it is likely that the host system 12 will include storage devices of a much higher capacity than storage devices present in client system 14.

Of course, one of ordinary skill in the art will understand that the capabilities of the functional elements can be adjusted as needed. The nature of the invention is such that one skilled in the art of writing computer executable code (i.e., software) can implement the described functions using one or more of a combination of popular computer programming languages and developing environments including, but not limited to C++, Visual Basic, Java, HTML and web application development applications.

Although the present invention is described by way of example herein and in terms of a web-based system using web browsers and a web site server (host system 12), Message Interface System 10 is not limited to the above configuration. It is contemplated that Message Interface System 10 is arranged such that client systems 14 communicate with and display data received from host systems 12, using any known communication and display method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on client system 14, for example, DOS, WINDOWS 3.x, WINDOWS 95, WINDOWS 98, WINDOWS NT, WINDOWS 2000, WINDOWS ME, WINDOWS CE, WINDOWS XP, MAC OS, UNIX, LINUX, PALM OS and any other suitable operating system.

As used herein, references to displaying data on client system 14 refers to the process of communicating data to the terminal across communication network 16 and processing the data such that the data is viewed on the terminal displays 30, for example by using a web browser and the like. As is common with web browsing software, the display screen on terminals 14 present sites within the networked system 10 such that a user can proceed from site to site within the system by selecting a desired link.

Further, references to displaying data on client system 14 regard the process of communicating data to the terminal across communication network 16 and processing the data such that the data can be viewed on the client systems' displays 30 using web browsers and the like. The display screens on client systems 14 present areas within Message Interface System 10 such that a user can proceed from area to area within the System by selecting a desired link. Therefore, each user's experience with Message Interface System 10 is based on the order with which they progress through the display screens. Graphic controls are available in the display screens and modules to initiate data processes, and to provide convenient navigation between the display screens and modules of Message Interface System 10. In other words, because the system is not completely hierarchical in its arrangement of display screens, users can proceed from area to area without the need to "backtrack" through a series of display screens. For that reason, and unless stated otherwise, the following discussion is not intended to represent any sequential operation steps, but rather to illustrate the components of Message Interface System 10.

As noted above, the client system and host system typically communicate through middleware application software. The messages transmitted are typically in a specific "native" format. A middleware application routes the messages to their proper end-points, thereby connecting multiple delivery channels with multiple core processing systems. Message interfaces are necessary to format data messages in recognizable ways to ensure client systems and host systems can communicate.

In accordance with the principles of the present invention, an API specification defines how data are to be formatted so that data requests and responses will comply with API specifications. The sample API specification 4 (FIG. 2) defines, among other things, a record layout for a host system API.

In the API specification 4, two kinds of data packets are identified: request data packet 6 and response data packet 8. Request data packet 6 is directed to a request for data stored on a host system, and is transmitted from a client system. Response data packet 8 is directed to data sent from a host system that replies to a client system's data request.

In the example shown in FIG. 2, request data packet 6 identifies six fields: a transaction code, a credit union access code, a member number, an account suffix, a transfer amount and a post indicator. Each field in the API specification 4 has a specific format, for example a field type and field length and default entry. For example the transaction code has is an numeric field, is 3 digits long and has a default value of "033."

Similar to the request data packet 6, the response data packet 8 comprises a plurality of fields including transaction code, credit union access code, member number and host response code. Additionally, default data values and data formats are provided. As shown in the example request data packet 6, the transaction code for the response data packet 8 is a three digit numeric value. Also, the transaction code in the response data packet 8 has a default data value of "033.5"

As described above with regard to the prior art process of developing message interfaces between client systems and host systems, the API specification 4 provides details of the specific API's used by client and host systems. When an interface is developed and complies with the API specification, the middleware application software delivers intelligible messages between the host and client systems.

Figure 7:
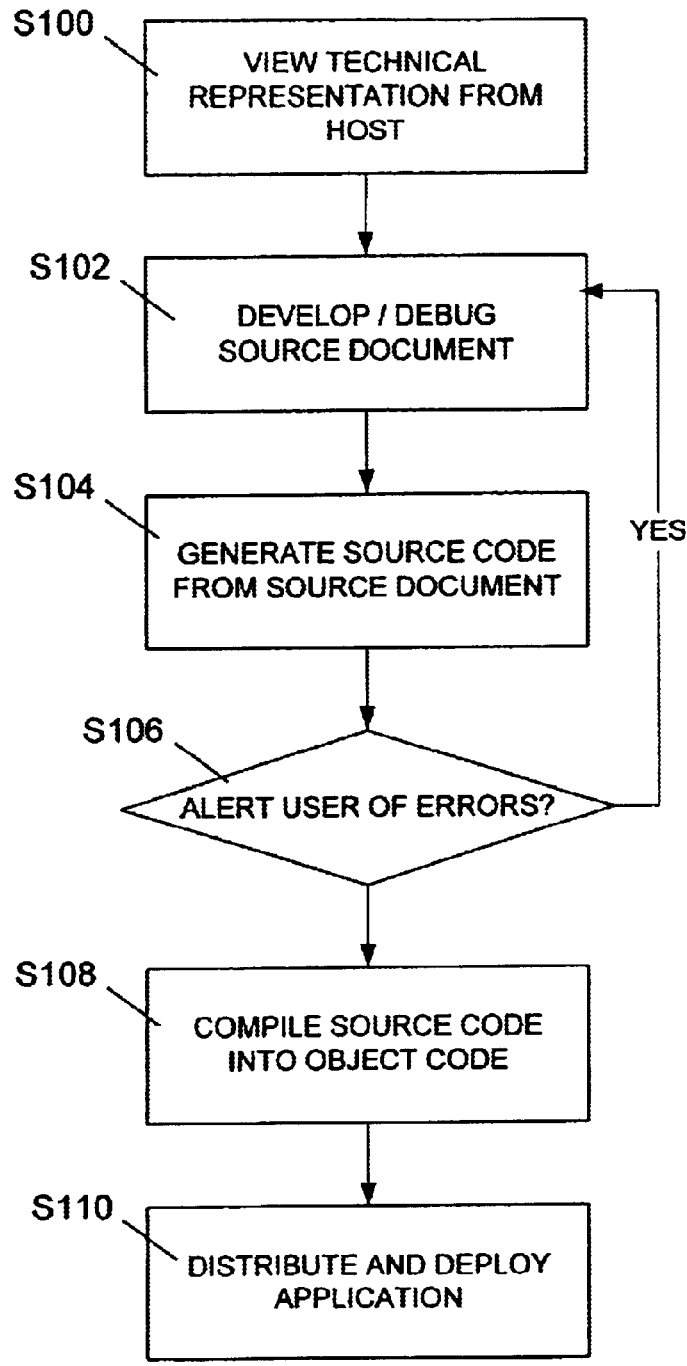
FIG. 7 is a flowchart illustrating the steps for generating an interface according to the principles of the present invention.

Now referring to FIG. 7, the process of generating message interfaces according to the present invention is illustrated. The present invention effectively eliminates the need for a technical person to develop a mapping document describing a target API for a programming team to use as guidelines. Moreover, the present invention eliminates the need for one or more programmers to implement the mapping document into high-level program source code. Instead, as noted above, a project manager or other technical person develops a source document that is generated into a high-level computer program language, for example VISUAL C++ or VISUAL BASIC. In accordance with the principles of the present invention, the computer program source code is compiled into machine readable object code, thus producing an interface and enabling communication between a client system and a host system.

In step S100 (FIG. 7), a technical specification of the host system API is received from the host system. In step S102, a technical person (e.g., a project manager) develops and/or debugs a source document to be generated into high level program source code in accordance with the principles of the present invention. In the preferred embodiment the source document is generated in XML. In step S104 the technical person processes the source document and generates source code therefor. During the step of generating the source document into program source code, errors may be discovered, thus identifying problems with the source document. Example source document errors include logic problems, syntax errors, or non-compliance with the middleware schema. In the event that errors are found, the technical person developing the source document is prompted to correct the source document (step S106). When the error(s) are discovered, the process reverts back to step S102. The technical person makes the corrections to the source document and again generates the source document in to program source code. When all errors are remedied, program source code is generated in a desired, high level programming language, for example VISUAL C++ or Java,. Thereafter the application is compiled into machine readable object code (step S108), distributed and deployed (step S110).

Figure 8:
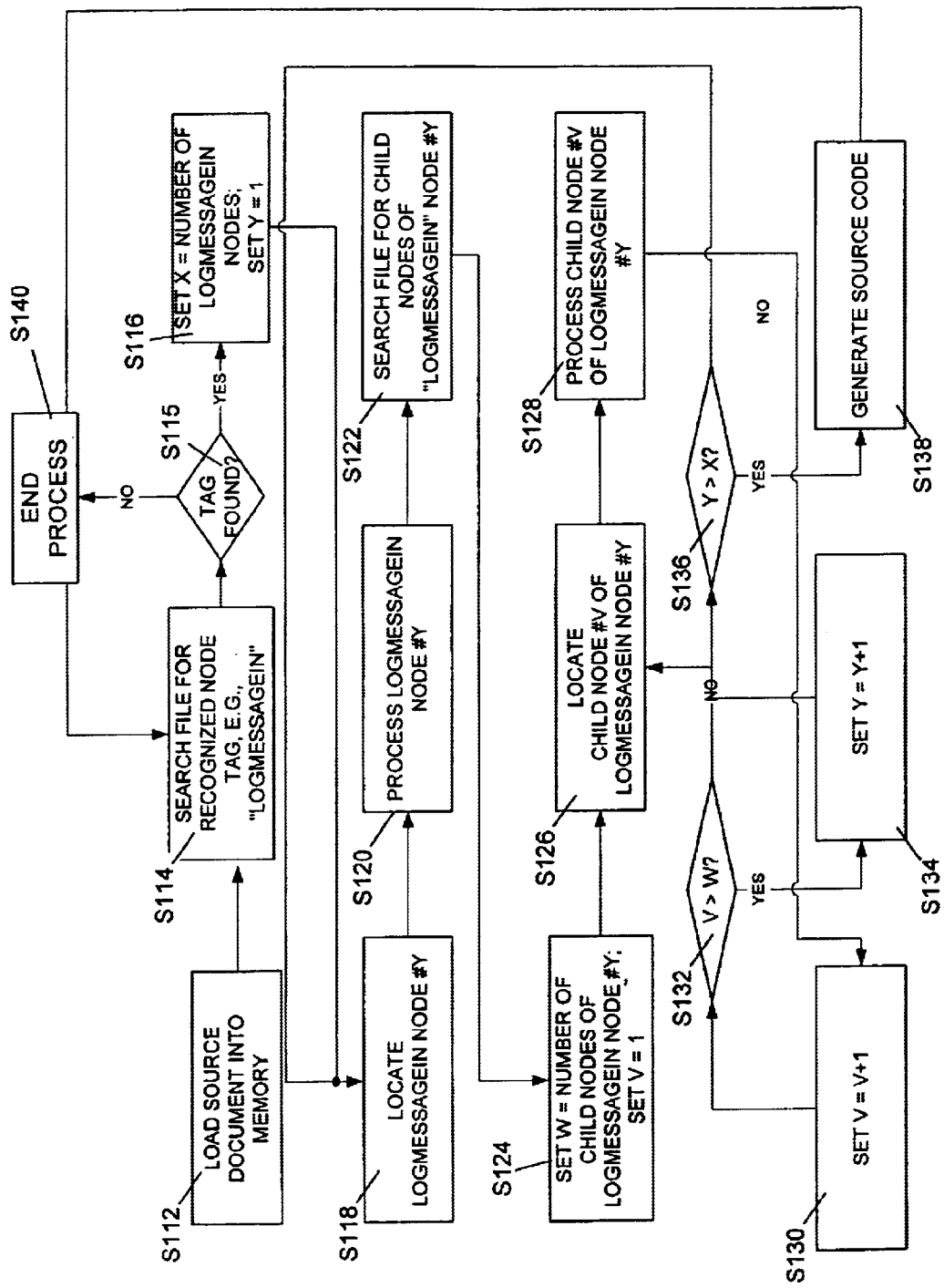
FIG. 8 shows a detailed flowchart illustrating the steps for generating a source document into a source code written in a high level programming language.

FIG. 8 shows more detail regarding step S104, i.e., the step of processing the source document. In step S112, the source document created by the technical person is loaded into memory. In step S114, recognizable nodes (i.e., functional blocks of the source document) are searched in the document file for processing. The nodes to be processed contain recognizable keywords that are available via the middleware schema. When recognized nodes are identified, a series of conditional statements are evaluated by the present invention. For example, if a node has an attribute that is considered TRUE, the code generating part of the invention spawns source code directed to the functionality contained therein.

In the example shown in FIG. 8, the present invention searches for the node tag, "LogMessageIn," in the source document (step S114). If a LogMessageIn node is found by Message Interface System 10 (step S115), then the system loops to step S116 and a variable, "X" is set to equal the number of LogMessageIn nodes contained in the file. Moreover, a counter variable, "Y", is set to equal 1 and acts as an index for a program loop. If a LogMessageIn node is not found, the process terminates (step S140).

In step S118, Message Interface System 10 locates $Y^{th}$ occurrence of the LogMessageIn node. For example, where Y equals 1, the first occurrence of the LogMessageIn node is located by Message Interface System 10.

Once a node is recognized, in the present example the LogMessageIn node, Message Interface System 10 preferably evaluates the node and identifies specific functionality therein. The system generates corresponding source code based upon the attributes associated with the evaluated node. The source code is temporarily stored in memory while the system searches for child nodes of the parent node, LogMessageIn node number 1 (step S122).

Similar to processing parent nodes, Message Interface System 10 sets a variable, "W," to equal the number of child nodes of the parent node number Y. Also, the system will set a counter variable, V, to equal 1 (step S124). Thereafter, the system will locate the $V^{th}$ occurrence of the child node of the parent node Y. For example, where V equals 1, the first child node of the parent node, LogMessageIn number 1, is located (step S126).

In step S128, Message Interface System 10 processes child node number V of node LogMessageIn number Y. The system evaluates the contents of child node V and generates source code corresponding with the attributes of the child node being examined. When the system is finished processing the child node, it proceeds to step S130 where it increments the counter variable, V, by 1.

Continuing with the current example, V now equals 2 and Message Interface System 10, in step S132, evaluates whether the value of V is greater than the value of W (i.e., whether there are any remaining unprocessed child nodes of the parent node). In the event that V is less than or equal to W, then the system loops back to step S126 and locates the next child node of the parent node, LogMessageIn node number 1. The system proceeds to step S128 and evaluates the child node number 2 and when completed, proceeds back to step S130 where the counter, V, is again incremented by 1.

In step S132, the system evaluates whether V is greater than W (i.e., whether there are no child nodes left to process) and, if the system has processed all of the corresponding child nodes, the system loops to step S134 and increments the counter Y. The counter Y represents the next parent node, in this example the next LogMessageIn node to evaluate. The system then determines, in step S136, whether the value of Y is greater than the value of X (i.e., whether there are any parent nodes left to process). In the event that Y is less than or equal to X, Message Interface System 10 loops back to step S118 and locates the next, unexamined, LogMessageIn node. The process continues until Y is greater than X, and there are no LogMessageIn nodes left to process.

Continuing with the current example, after all of the LogMessageIn nodes are evaluated, the system proceeds to step S138 and source code is generated and appended to a file. In an alternative embodiment, Message Interface System 10 appends program source code generated during the evaluation process immediately to an existing file. After the source code is generated, then the system loops back to step S114 to locate the next recognized node, for example, "LogMessageOut." The process repeats until all parent nodes in the source document have been processed.

FIG. 9 contains program code which illustrates how a source document is evaluated. As shown in lines 1–3, the individual node, "LogMessageIn" is located, and the number of LogMessageIn node occurrences is determined at lines 5–8. The system loops through each LogMessageIn parent node to process the contents therein, as shown in line 10. For each LogMessageIn node, Message Interface System 10 appends source code in the target programming language. In the example shown in lines 19–32, program code is generated in the VISUAL BASIC programming language, and in an alternative embodiment, lines 35–50 depict programming code being generated in the C++ programming language is shown.

FIG. 10 shows a sample of program code directed to processing individual message nodes according to the principles of the present invention. Lines 4–9 therein illustrate how child nodes of a parent node are identified and counted. As with the parent nodes, the system loops through each child node for processing. Beginning at line 56, the child node, "IDTAG_BitmapDatein" is identified and the attributes thereof are evaluated. Message Interface System 10 evaluates the extracted data and, provided no errors are found, program source code is generated in the target programming language. The source code is appended to a file, as shown in line 74. As noted above with respect to step S132 (FIG. 8), the process of extracting child nodes repeats until all of the child nodes have been evaluated and/or generated into target source code.

After the source code is generated, Message Interface System 10 preferably automatically launches the corresponding program development environment of the target source code programming language, e.g., VISUAL BASIC or VISUAL C++. When the development environment is active, the technical user compiles the generated source code into object code using the functionality provided therein. In other words, using the "native" interface, the user compiles the source code generated by Message Interface System 10.

The logic associated with parent nodes, also known in the industry as "top level nodes," typically relates to broad data management activity. For example, in an XML document, MessageOut nodes handle the broad concept of delivering messages to a host system. Other examples of top level nodes in XML include "InterceptMessage" nodes for handling unsolicited messages sent from a host system, "MessageIn" nodes for handling incoming messages from a host system, "LogMessageIn" and "LogMessageOut" nodes for handling logging the messages sent via MessageIn and MessageOut nodes. Log messages provide English-like messages to a user in order to identify a specific occurrence of activity. Within the top level nodes, more specific formatting instructions and other data related instructions are provided by corresponding child level (or "lower level nodes").

The processes employed by the present invention to evaluate parent nodes and child nodes is essentially identical, with one exception being the nature of the conditional being employed. For example, the MessageOut node instructs output to be sent to the host system device through the middleware application software. Child nodes related to the MessageOut node direct the formatting of the data that are sent to the host system.

During the evaluation of the source document, a stringent check of syntax is performed to ensure that all of the nodes are defined and formatted correctly. If a document is not "well formed," then either the node will not be evaluated properly, or the source code that is generated in response thereto will not function correctly. The ability of Message Interface System 10 to ensure that the source document is well formed assures accurate and functional source code that will interface with middleware applications seamlessly. By ensuring the accuracy of the generated source code during the development of the source document, resources, including time and money, are saved. If any information is missing from a node, or the document is not well formed for other reasons, an error message is preferably generated to alert the author of the source document that an error exists and requires correction.

In a typical host to client messaging system, one module is used to handle messages being sent from a host system, and a separate module is used to handle messages being sent from a client system. Typically, a plurality of modules are created for handling messages sent a plurality of host systems because the host systems each have unique API's. However, a single client system module can be designed which handles messaging with a plurality of host systems, and to receive a plurality of messages sent from a plurality of host systems. For example, a client system transmits a request to a host system in a specific format. The client system further expects that the response from the host system will be formatted according to the client's API. Therefore, regardless of the host system that transmits requests or responses to a client, the client system expects the message to be formatted in a single, specific way. One single module, therefore, handles formatting messages that are received from a plurality of host systems. Whenever a client system communicates with a new host system, however, a new message interface must be developed to accommodate the host systems API.

To further expedite the message interface building, Message Interface System 10 provides a convenient graphic user interface to develop new message interfaces. A discussion regarding the graphic user interface to develop new message interfaces is now provided.

Figure 11:
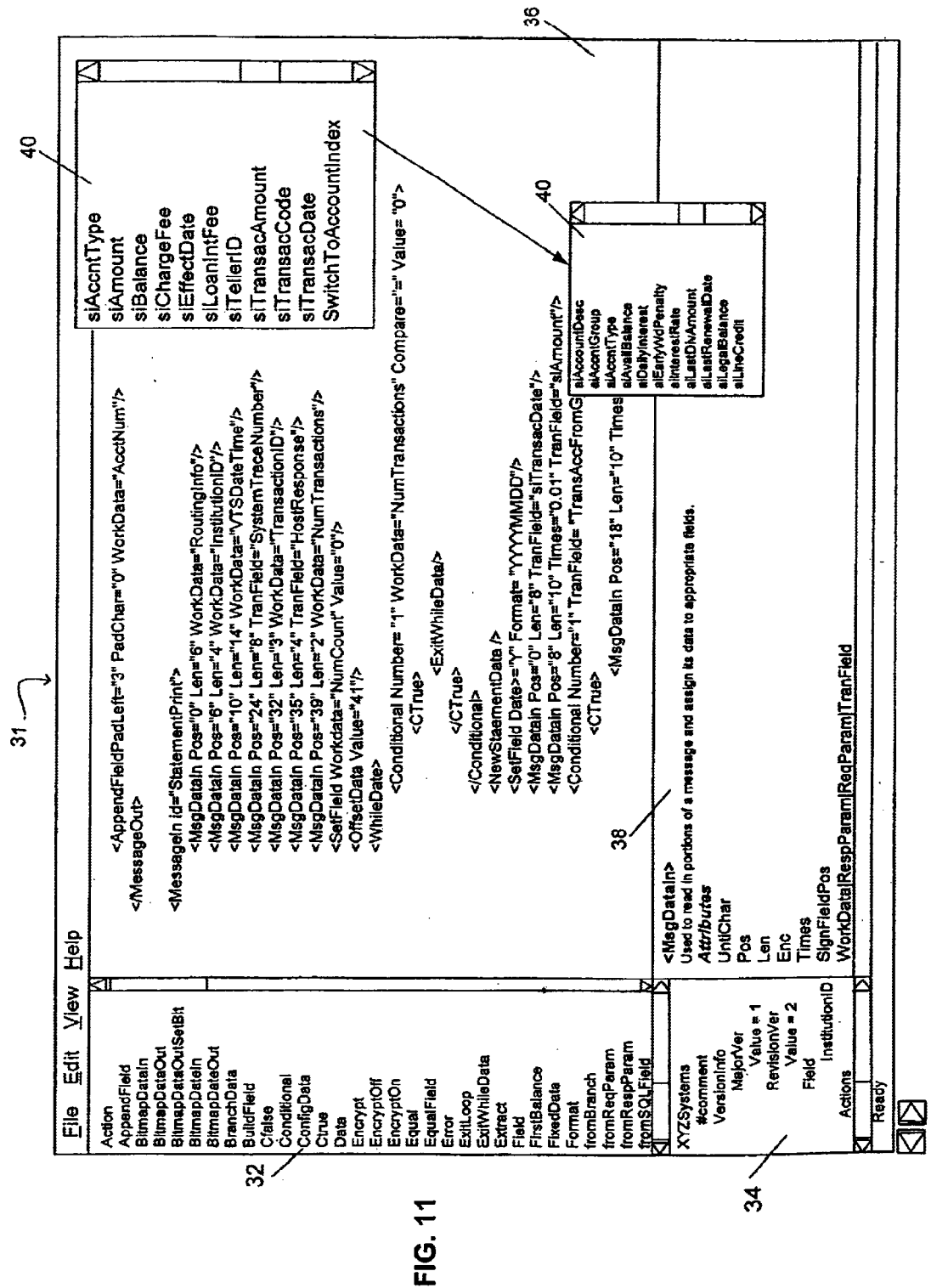
FIG. 11 illustrates a sample front-end application for developing source documents.

The front-end user application provided by Message Interface System 10 enables a technical person, for example a project manager, to develop source code efficiently. In the example shown in FIG. 11, a user generates source code by developing an XML document via the front-end application 31. As shown in FIG. 11, commands that are compatible with the middleware schema are provided in command window 32. The technical person uses a pointing device, such as a mouse or trackball, to select a command in the command window 32, and further to assign attributes to the command in order to identify formats and values therefor. In the variable window 34, as shown in FIG. 11, the technical person can review the status of specific variables and status of the source document being generated. In the source document window 36, the source document is displayed. In command help window 38, the technical person is provided with information regarding the specific command being used. Additionally, users are prompted to comply with the middleware schema, as shown in prompt window 40. Moreover, windows 32–40 are capable of displaying information besides commands, status information, source document information, help and prompts.

According to the principles of the present invention, the contents of any of the windows in the front-end application can change dynamically. Depending upon the context, the windows 32–40 display varying information. For example, help window 38 can display information regarding the overall formation of the source document. If errors are found in the source document, the nature of the errors and suggested fixes are shown in help window 38. After the technical person is satisfied with the source document, he or she selects a graphic control in the display screen to generate source code in the target programming language. For example, the user selects a graphic icon which instructs the application to generate source code, and the user selects C++ from a list of available programming languages. During the source code generation process (described above with reference to FIG. 7), if any errors are found then Message Interface System 10 preferably prompts the user thereto. The technical person is then able to make necessary corrections to the source document and the generation of source code process begins again.

By using the front-end application to develop source documents, eventually source code, Message Interface System 10 provides a unique and efficient way to generate source code for message interfaces. Rather than hand typing a source document that is compliant with a middleware schema, a user of the present invention has a series of prompts and controls to generate the source document. As noted above, the technical person is assured that the source document is well formed, and that the source code that is generated therefrom will run correctly.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method for developing an electronic message interface, said method comprising:

using a first software application to develop a source document in a first format, said source document providing instructions for said electronic message interface to enable a second software application operating on a first computer system to communicate with a third software application operating on a second computer system, wherein said instructions comply with an application program interface provided by said second software application;

using said first software application to electronically evaluate said source document to identify keywords, said keywords representing directives for said electronic message interface;

using said first software application to electronically generate program source code in a high level programming language different than said first format as a function of said step of identifying said keywords in said source document, said program source code comprising directives for said electronic message interface; and compiling said program source code into object code, said object code functioning as said electronic message interface comprising said instructions complying with said application program interface.

2. The method of claim 1, wherein said electronic message interface formats a data message prior to a middleware application transmitting said data message to said second computer system.

3. The method of claim 1, wherein said electronic message interface formats a data message after a middleware application transmits said data message to said first computer system.

4. The method of claim 1, wherein said first computer system is a host system and said second computer system is a client system.

5. The method of claim 1, wherein said first computer system is a client system and said second computer system is a host system.

6. The method of claim 1, wherein said step of electronically generating source code comprises evaluating conditions corresponding with said keywords identified in said source document, and generating said program source code as a function of said evaluated conditions.

7. The method of claim 1, further comprising applying a schema to develop said source document, said schema comprising said keywords.

8. The method of claim 1, wherein said first software application comprises a front-end software application used to generate said source document.

9. The method of claim 8, wherein said front-end software application prompts a user of said front-end software application with a schema during development of said source document.

10. The method of claim 8, wherein said front-end software application notifies a user when said source document contains errors.

11. A message interface software application operating on an information processor for developing an electronic message interface, said message interface software application comprising:

a source document development module, said source document development module enabling a user to develop a source document in a first format, said source document providing instructions for said electronic message interface to enable electronic communication between a first computer software application operating on a first computer system and a second computer software application operating on a second computer system, wherein said instructions comply with an application program interface provided by said first software application;

a program evaluation module, said program evaluation module electronically evaluating said source document to identify keywords in said source document, said keywords representing directives in said source document for said electronic message interface;

a source code generation module, said source code generation module electronically generating program source code in a high level programming language different than said first format as a function of identifying said keywords in said source document, said program source code comprising directives for said electronic message interface; and a program compiler, said program compiler compiling said source code into object code, said object code functioning as said electronic message interface comprising instructions complying with said application program interface.

12. The message interface software application of claim 11, further comprising a middleware application that transmits at least one data message from said second computer system to said first computer system, said at least one data message formatted by said electronic message interface prior to said middleware application transmitting said at least one data message to said first computer system.

13. The message interface software application of claim 11, further comprising a middleware application that transmits at least one data message from said second computer system to said first computer system, at least one data message formatted by said electronic message interface after said middleware application transmits said at least one data message to said first computer system.

14. The message interface software application of claim 11, wherein said first computer system is a host system and said second computer system is a client system.

15. The message interface software application of claim 11, wherein said first computer system is a client system and said second computer system is a host system.

16. The message interface software application of claim 11, wherein said source code generation module evaluates conditions in statements corresponding with said keywords identified in said source document, and said source code generation module generates program source code as a function of said evaluated conditions.

17. The message interface software application of claim 11, further comprising a schema used to develop said source document, said schema comprising said keywords used in said step of generation of said program source code.

18. The message interface software application of claim 11, further comprising a front-end software application used to generate said source document.

19. The message interface software application of claim 18, wherein said front-end software application prompts a user of said front-end software application with a schema during development of said source document.

20. The message interface software application of claim 18, wherein said front-end software application notifies a user when said source document contains errors.

21. A software application operable in a memory for developing an electronic message interface, said software application comprising:

a program evaluation module, said program evaluation module electronically evaluating a source document, said source document provided in a first format and providing instructions for electronic communication between a first computer software application operating on a first computer system and a second computer software application operating on a second computer system, said instructions directing data messages to be formatted to comply with an application program interface provided by said first computer system;

said program evaluation module identifying keywords in said source document, said keywords representing directives in said source document for said electronic communication with said first computer software application;

a source code generation module, said source code generation module electronically generating program source code in a high level programming language different than said first format as a function of identifying said keywords in said source document, said program source code comprising directives for said electronic communication with said first computer software application; and a program compiler, said program compiler compiling said source code into object code, said object code functioning as said electronic message interface comprising instructions to format data messages sent by a second computer system, wherein said instructions comply with an application program interface corresponding with said first computer software application.

* * * * *